United States Patent [19]

Shen et al.

[11] Patent Number: 5,038,641
[45] Date of Patent: Aug. 13, 1991

[54] DRILL WITH IMPROVED WEAR INSERTS

[75] Inventors: Chi-Hung Shen, Troy; John Alverio, Shelby Township, Macomb County, both of Mich.

[73] Assignee: General Motors Corporation, Detroit, Mich.

[21] Appl. No.: 658,489

[22] Filed: Feb. 21, 1991

[51] Int. Cl.$^5$ ............................................. B21K 5/04
[52] U.S. Cl. ............................. 76/108.6; 76/DIG. 11; 76/DIG. 12; 408/145; 408/230
[58] Field of Search ............... 76/108.1, 108.6, 101.1, 76/DIG. 11, DIG. 12; 408/144, 145, 230

[56] References Cited

U.S. PATENT DOCUMENTS

| | | | |
|---|---|---|---|
| 1,847,302 | 3/1932 | Emmons | 76/108.6 |
| 2,832,238 | 4/1958 | Brinker et al. | 76/108.1 |
| 4,679,971 | 7/1987 | Maier | 408/145 |

FOREIGN PATENT DOCUMENTS 0148826  10/1931  Switzerland ...................... 76/108.1

Primary Examiner—Roscoe V. Parker
Attorney, Agent, or Firm—Patrick M. Griffin

[57] ABSTRACT

The inserts and pockets in an inserted drill are provided with differing curvatures on their arcuate back edges. Consequently, when the insert is aligned in the pocket, a crescent shaped, instead of annular, gap is created, with minimal or no thickness at the outboard ends. Very little braze seam is thus exposed to erosion at the cutting edge, but the braze seam is as strong or stronger than conventionally. It is also easier to maintain the desired thickness of the braze seam during manufacture.

2 Claims, 2 Drawing Sheets

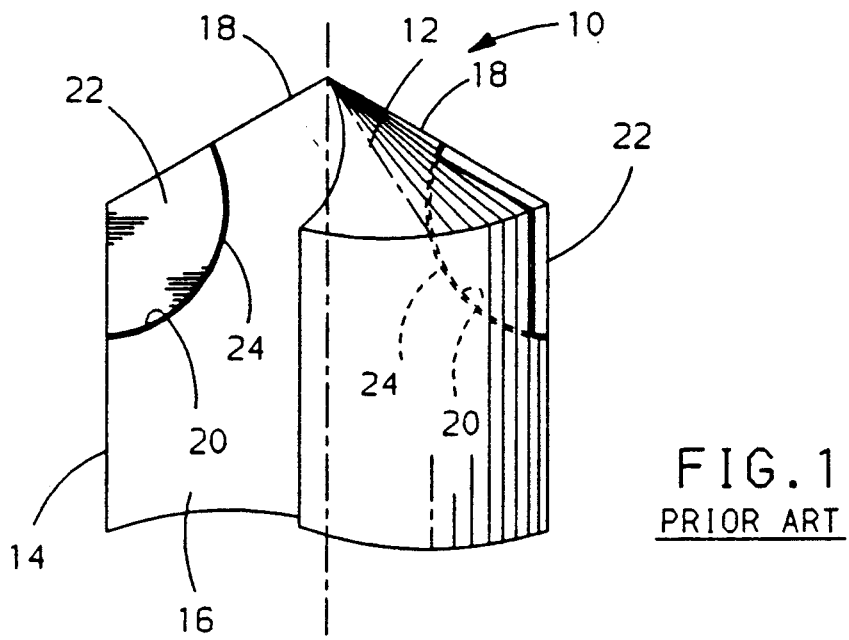
FIG. 1
PRIOR ART
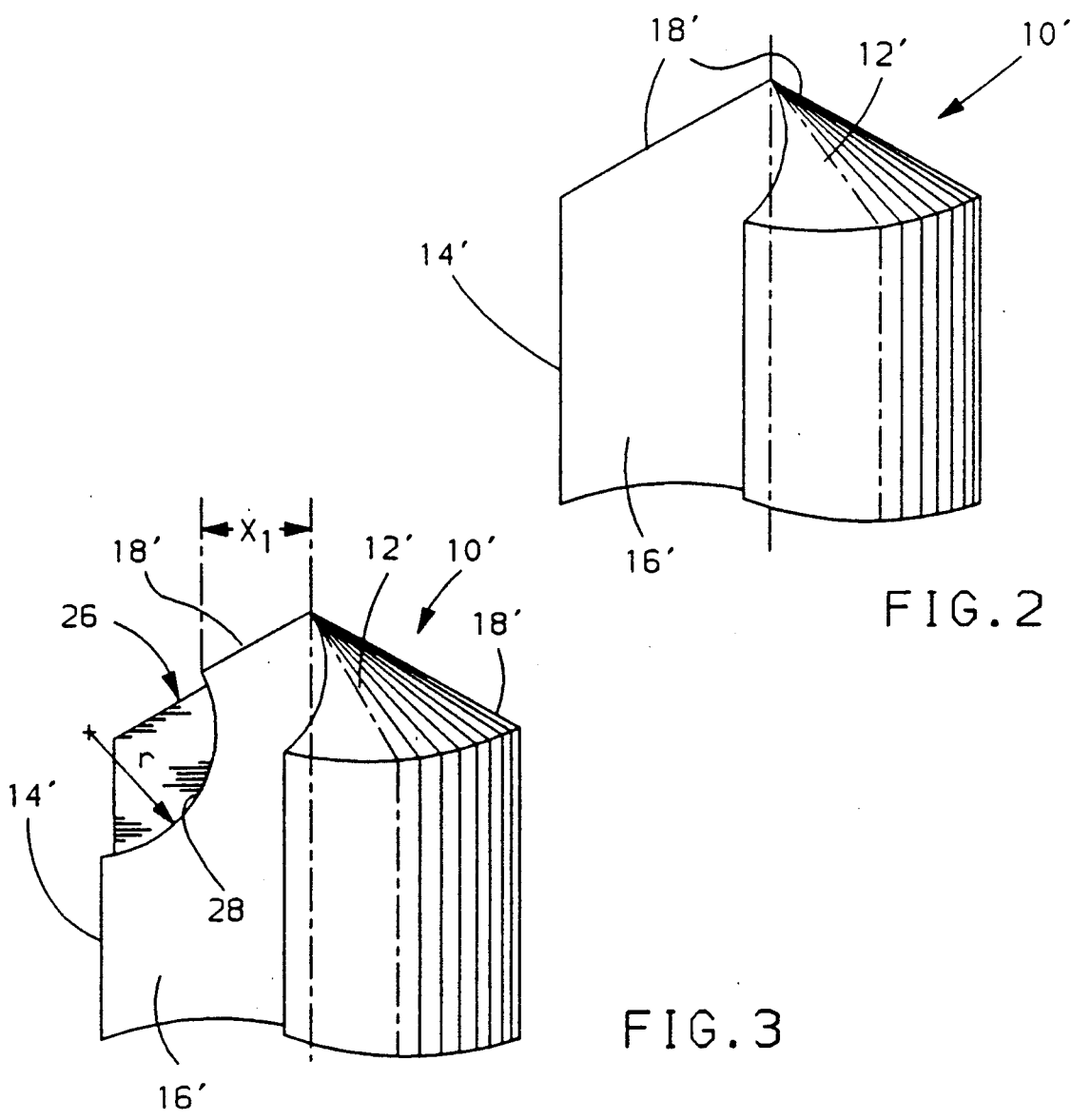
FIG. 2
FIG. 3

DRILL WITH IMPROVED WEAR INSERTS

This invention relates to drills in general, and specifically to an improved method of producing a drill with wear resistant cutting edge inserts.

BACKGROUND OF THE INVENTION

The cutting edges of one type of standard drill are produced by the intersection of two or more axially extending flutes with the conical head of the cylindrical body of the drill. The straight cutting edges so created run from the apex of the conical head to the cylindrical side wall of the drill body, creating an obtuse angled corner. In some cutting applications, it is desired to give the cutting edges more wear resistance than the material of the drill body alone could provide. Since it is the outboard portion of the cutting edges that moves at the highest cutting speed, and therefore sees the most potential wear, it is often enough to enhance just that outboard portion, creating what may be referred to as an inserted drill. This is typically done by machining a pocket with an arcuate back edge into the face of the flute, across the corner. An insert of more wear resistant material is cut to basically the same size as the pocket, with an arcuate back edge of substantially the same radius and curvature. When attached into the pocket, an edge of the insert will be aligned with what remains of the original cutting edge, becoming part of it, in effect.

The insert is typically attached to the drill body by a brazing process. In the brazing process, a piece of brazing material cut from a thin sheet to approximately the same shape as the pocket is placed in the pocket and liquefied by melting it with a torch. Then, the insert is delicately laid into the pocket on top of the melted layer of brazing material by an operator working with a tweezer like tool. The insert in effect floats on the melted layer as it is carefully manipulated until its outer straight edge is aligned with the cutting edge of the drill body. As a practical matter, it is not possible to machine the pocket and insert arcuate edges closely enough that they can be pushed hard against one another with no gap therebetween. As a result, the operator is obliged to hold a semi annular gap between the two arcuate edges as the insert is maneuvered. it is difficult to minimize that gap, since there is no positive stop to work against, and because the operator has to worry about aligning of the rest on the insert, as well. consequently, brazing material inevitably is squeezed into and hardens in the gap between the arcuate edges, creating a semi annular seam, one end of which intersects the cutting edge. The brazing material is much softer than either the drill material or the insert, and is therefore subject to wear and erosion from the workpiece as the drill cuts.

SUMMARY OF THE INVENTION

The invention provides a method of attaching wear resistant inserts to a drill body in which the gap between the arcuate edges of the insert and pocket may be easily maintained, and yet creates very little area subject to erosion.

In the method disclosed, the pocket and insert are basically size matched, but the radius of the arcuate back edge of the insert is deliberately made larger than that of the pocket, so that it has a shallower curvature, and is non concentric therewith. As a consequence, when the insert is aligned and pushed in the pocket as far as it will go, the two arcuate edges converge at the cutting edge and at the side wall of the drill body, but are spaced apart at all other points. The two arcuate edges in effect create a crescent shaped gap of variant thickness that is thickest in the center, but with essentially a zero thickness at its ends, where it intersects the cutting edge and side wall of the drill body. The dimensions of the gap may be easily held by holding the insert tightly in the pocket. The seam of brazing material that is created in the gap presents very little area to the cutting edge, and so has minimal wear exposure.

It is, therefore, a general object of the invention to provide an improved method of attaching wear inserts to a drill's cutting edges.

It is another object of the invention to provide such a method in which desired shape and thickness of the brazing seam is simple to maintain during the brazing process.

It is another object of the invention to provide brazing seams that present very little area to the cutting edges.

DESCRIPTION OF THE PREFERRED EMBODIMENT

These and other objects and features of the invention will appear from the following written description, and from the drawings, in which:

FIG. 1 is a view of the end of a prior art drill with conventional cutting edge inserts;

FIG. 2 is a view of the end of a drill body;

FIG. 3 is a view of the end of the drill body with one pocket ground in;

Figure 4:
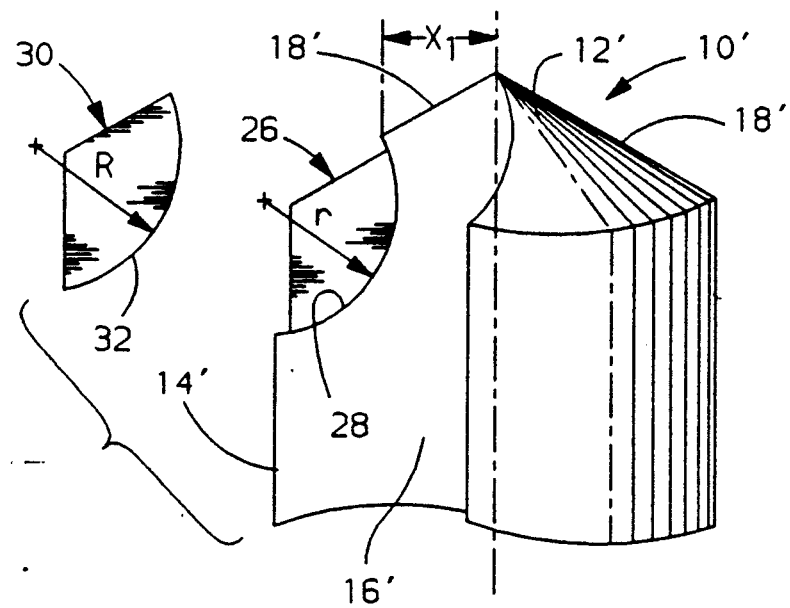
FIG. 4 is a view of the drill body and pocket also showing a matching insert as yet unattached.

Referring first to FIG. 1, the prior art type of drill discussed above is illustrated. A conventional drill body, indicated generally at 10, has a conical head 12 and a cylindrical side wall 14 that is interrupted by a pair of straight, axially running flat faced flutes 16. Where the flutes 16 intersect the conical head 12, a pair of straight cutting edges 18 are created, each of which runs radially out and axially down from the apex of head 12. It should also be understood that similar drill bodies may be helical, with flutes that are axially extending, but not straight. These flutes will still create cutting edges where the faces thereof intersect the conical head of the drill body. The side wall 14 and each cutting edge 18 together form a corner on the face of each flute 16, with an obtuse angle of about 120 degrees. The outboard part of each cutting edge 18 is hardened by machining an arcuate, semicircular pocket 20 across the corner of flute 16, and filling it with a size matched insert 22 of cubic boron nitride or similar material. In the conventional construction shown, the curvature of pocket 20 and insert 22 are substantially the same. That is, the radii of their circular back edges are substantially equal. As insert 22 is brazed in place, the circular edges end up with a semi annular gap, not touching or intersecting at any point, as described above. Therefore, a semi annular seam of brazing material 24 is created with a significant thickness at each end. While the edge of insert 22 forms part of a more or less continuous cutting edge 18, it is interrupted by the end of seam 24. The end of seam 24 is inherently subject to wear and erosion, since the brazing material is softer than either the insert 22 or the drill body 10.

Referring next to FIGS. 2 and 3, the method of the invention is illustrated. As shown in FIG. 2, an identical drill body 10' is used. Equivalent parts are given the same number as above with a prime. As seen in FIG. 3, the first step is to machine a pocket, indicated generally at 26, across the corner of flute 16' with a predetermined radius "r". Pocket 26 is basically pie shaped, with a semicircular, arcuate back edge 28. Fundamentally, the important factor is that pocket 26 have a back edge 28 with a predetermined curvature, even if not laying on a perfect circle. A circular back edge 28 is easier to machine than one that is simply curved. The absolute value of r is not so important to the method of the invention as its relative value, described below. However, r would be chosen, as a practical matter, so as to leave as much of the original cutting edge 18 as possible. This remainder is indicated by the distance $X_1$ from the center line of drill body 10', and would vary with every particular cutting application, depending on the material to be cut and cutting speed used. In addition, as disclosed, pocket 26 is not cut exactly symmetrically across the corner of flute 16', although it could be, and so radius r does not pass directly through the corner.

Figure 5:
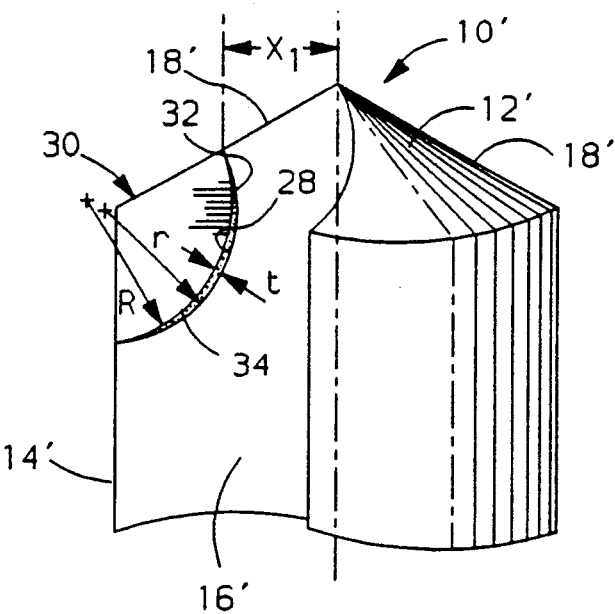
FIG. 5 is a view of the end of the drill body showing one insert brazed in place.

Referring next to FIGS. 4 and 5, the next step is to cut out an insert, indicated generally at 30, of the same material as conventional insert 22 described above. Basically, insert 30 is size matched to pocket 26, that is, it is designed to fill in where pocket 26 was cut out. However, there is a very important difference from the way conventional insert 22 is shaped. Insert 30 is given a back edge 32 which, although semicircular, has a radius R that is deliberately made *larger* than the radius r of pocket 26. It is also easier to make the insert back edge 32 somewhat larger than pocket back edge 32 than it is to try to absolutely match them, as is done conventionally, especially since the amount of the radius differential is not critical. As seen in FIG. 5, when insert 30 is pushed into pocket 26 as far as it will go and aligned therewith, its larger radius back edge 32 touches pocket back edge 28 only at two points, at the cutting edge 18' and the side wall 14', which act like a positive stop. A crescent shaped gap is created with minimal thickness at its ends, and maximum thickness t in the center. The gap between the two back edges 28 and 32 is self maintaining, in effect, and can be held simply by keeping insert 30 pushed into pocket 26 as far as it will go as the melted brazing material flows into the gap. This may be contrasted to conventional insert 22, which must be carefully held to create an even, minimal thickness gap. The attachment seam 34 of brazing material that hardens in the crescent shaped gap is also of zero or minimal thickness at the ends, that is, at its intersection with cutting edge 18' and side wall 14', and thicker in the center where there is no contact with the workpiece during drilling.

Figure 6:
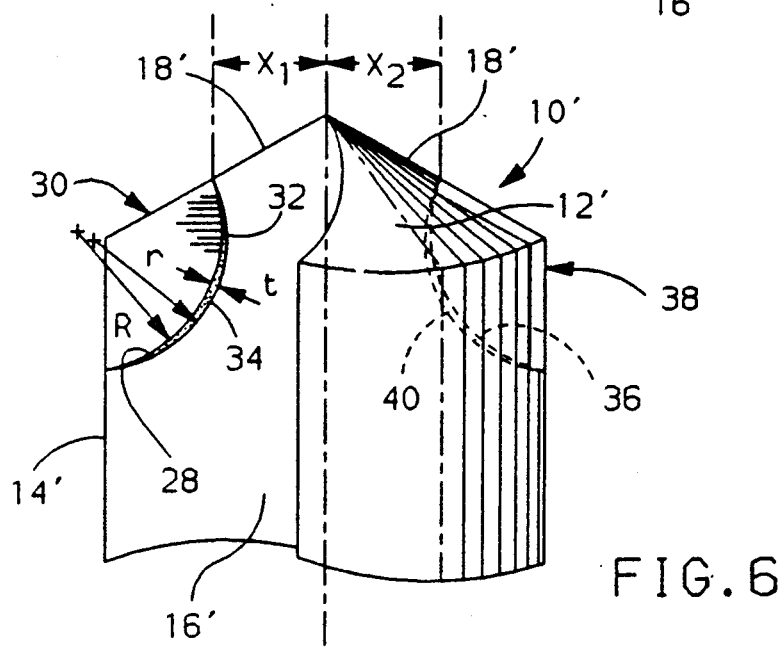
FIG. 6 is a view of the end of the drill body with two inserts brazed in place.

Referring next to FIG. 6, the final step is to machine another pocket 36 in the other flute 16', and attach a similarly sized insert 38 in it. The same design and sizing considerations apply as for pocket 26 and insert 30. An important difference is that the second pocket 36 is deliberately sized differently from first pocket 26, the purpose of which is to leave a cutting edge 18' remnant $X_2$ that is different than $X_1$, smaller in this case. This is so that the point of intersection of the other attachment seam 40 with its cutting edge 18' will be different from seam 34, and will not radially overlap therewith during the drilling process. Since both seams 34 and 40 present minimal area to the cutting edges 18', there will be minimal exposure to wear and erosion.

Variations in the disclosed method could be made, some of which were touched on above. In terms of structure, what is most important is that the back edge of the insert have a curvature that is shallower than, rather than equal to or sharper than, the pocket back edge. This is the geometric relationship that creates a gap and resultant attachment seam that is convergent toward its ends. This, in turn, is what gives the reduced erosion exposure of the ends of the seams, as well as making the gap easier to hold during the brazing process. It is practically easier to provide that basic geometric relationship of greater-shallower curvature and its attendant two point convergence by an insert radius greater than the pocket. However, non circular curvatures could be used. Even a V-shaped pocket back edge, and a shallower V-shaped insert back edge, could be used. In terms of processing, it would not be necessary for the operator doing the brazing to push the insert back edge 32 all the way into the pocket back edge 28. Fundamentally, merely aligning insert 30 closely within pocket 30 will create a gap and seam 34 that has minimal thickness at the ends, thinner than the conventional case. However, the convergent relationship does create a positive stop for the operator to work with, if desired. Theoretically, other liquid materials, such as advanced adhesives, may be found that would be strong enough to attach an insert. They, too, would enter and harden in the gap to create a seam. Since it is unlikely that such materials would be as wear resistant as the insert, it would still be beneficial to minimize their exposure. Therefore, it will be understood that it is not intended to limit the invention to just the embodiment disclosed.

The embodiments of the invention in which an exclusive property or privilege is claimed are defined as follows:

1. A method of providing enhanced wear resistance to a cylindrical drill body of the type having a conical head and at least one axially extending flute face that creates a straight cutting edge at the intersection of said flute face and conical head, said cutting edge running from an apex of said conical head to a corner at the side wall of said drill body, said method comprising the steps of;

machining a pocket into the face of said flute across said corner, said pocket having a back edge with a predetermined curvature, providing a wear resistant insert substantially size matched to said pocket, but with a back edge having a curvature slightly shallower than said predetermined curvature, aligning said insert in said pocket with said back edges touching at two points, thereby creating a crescent shaped gap between said back edges having maximum thickness at the center and a minimal thickness at its intersection with said cutting edge, and, attaching said insert into said pocket with a layer of liquid material that hardens in said crescent shaped gap to create a similarly shaped attachment seam, whereby said cutting edge has enhanced wear resistance while said attachment seam has minimal exposure to wear at said cutting edge.

2. A method of providing enhanced wear resistance to a cylindrical drill body of the type having a conical head and at least one axially extending flute face that creates a straight cutting edge at the intersection of said flute face and conical head, said cutting edge running from an apex of said conical head to a corner at the side wall of said drill body, said method comprising the steps of;

machining an arcuate pocket into the face of said flute across said corner, said pocket having an arcuate back edge of a predetermined radius, providing a wear resistant insert substantially size matched to said pocket, but with an arcuate back edge having a radius slightly larger than said predetermined radius, aligning said insert in said pocket, thereby creating a crescent shaped gap between said respective arcuate back edges having maximum thickness at the center of said arcuate edges and a minimal thickness at its intersection with said cutting edge, and, attaching said insert into said pocket with a layer of liquid material that hardens in said crescent shaped gap to create a similarly shaped attachment seam, whereby said cutting edge has enhanced wear resistance while said attachment seam has minimal exposure to wear at said cutting edge.

\* \* \* \* \*